W. B. LOWE.
VEHICLE SPRING SUSPENSION.
APPLICATION FILED NOV. 16, 1918.
1,396,044.
Patented Nov. 8, 1921.
3 SHEETS—SHEET 1.
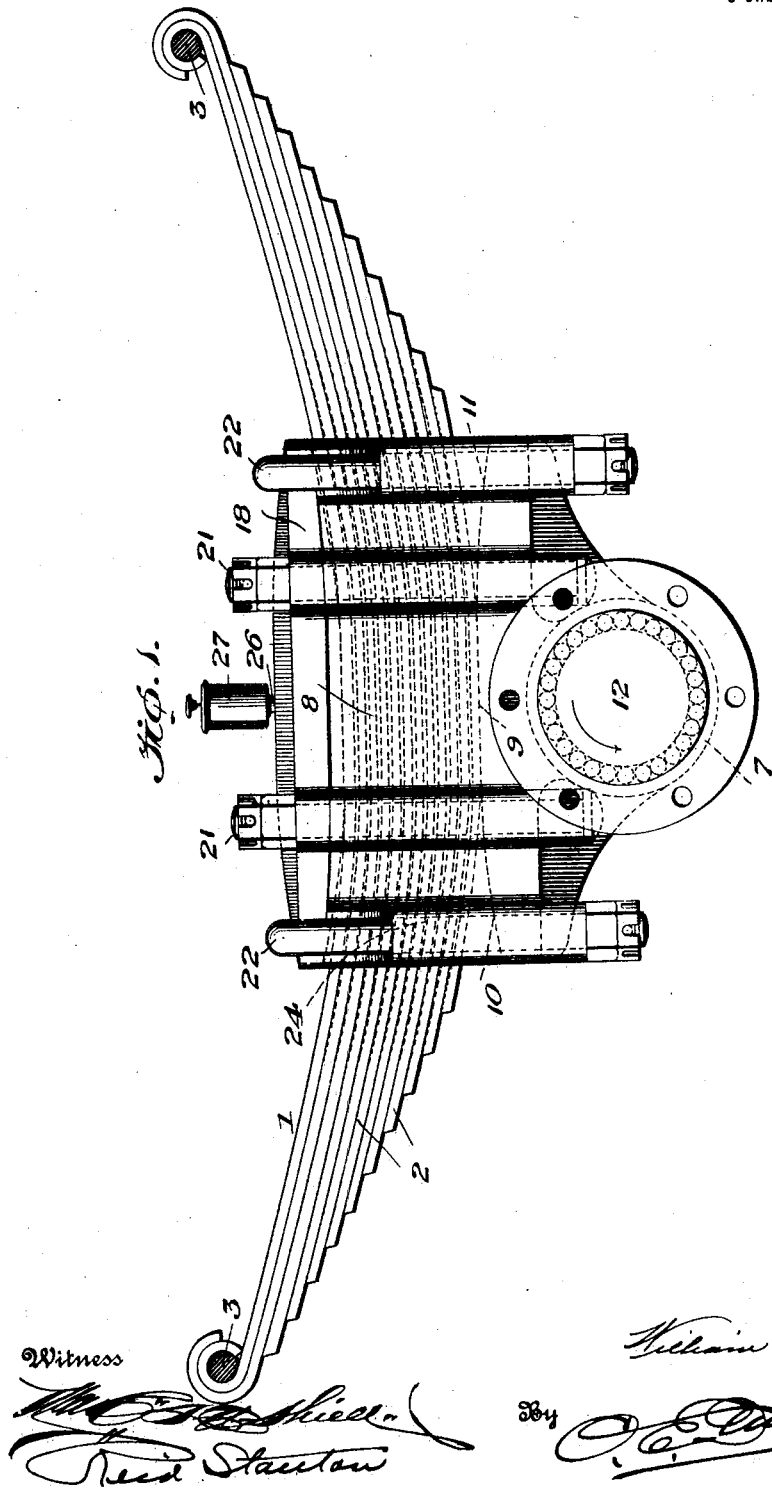

W. B. LOWE.
VEHICLE SPRING SUSPENSION.
APPLICATION FILED NOV. 16, 1918.
1,396,044.
Patented Nov. 8, 1921.
3 SHEETS—SHEET 2.
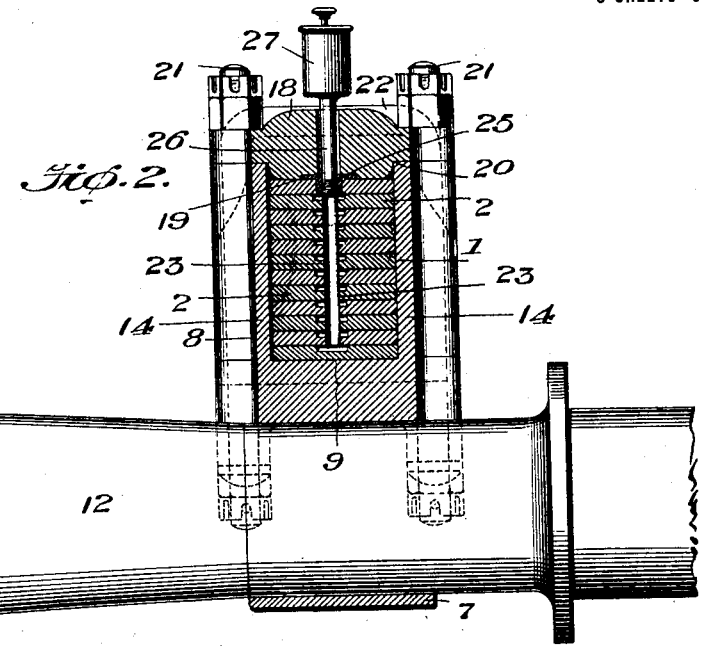
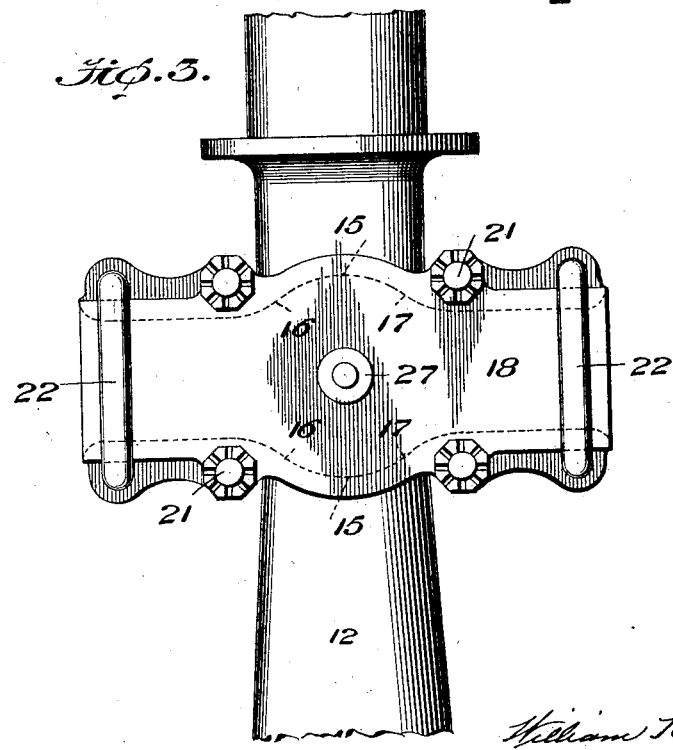

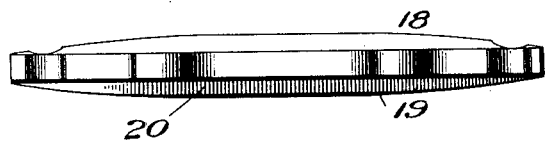
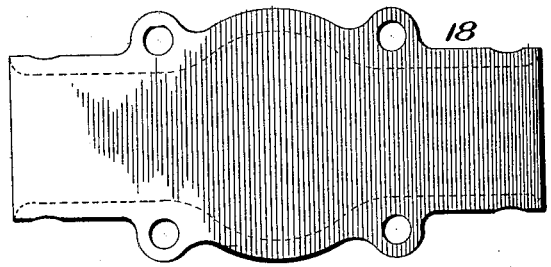
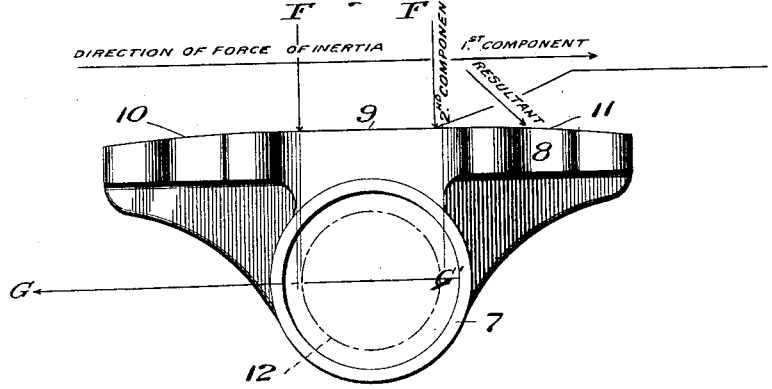
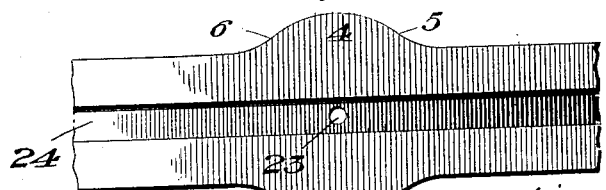

UNITED STATES PATENT OFFICE.

WILLIAM BELL LOWE, OF NEW YORK, N. Y.

VEHICLE-SPRING SUSPENSION.

1,396,044.  Specification of Letters Patent.  Patented Nov. 8, 1921.

Application filed November 16, 1918. Serial No. 262,842.

*To all whom it may concern:*

Be it known that I, WILLIAM B. LOWE, a citizen of the United States, residing at New York, in the county of New York and State of New York, have invented certain new and useful Improvements in Vehicle-Spring Suspensions; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to automobile spring suspension, but has special reference to trucks.

The invention has for its object to provide a spring and spring-housing construction in which the forces present in starting, backing or in accelerating motion are balanced in such manner that while the maximum of resiliency is obtained, the usual torque tending to and actually acting to tip the axle housing forward is neutralized to the extent that the axle-housing is at all times and under all conditions maintained in proper normal position; thus relieving the entire fabrication of mechanism from ruinous stresses and strains so disastrous to long life and proper and efficient functioning in this class of vehicles.

A further object of the invention is to provide an improved system for the proper and effective lubrication of the spring-leaves by a heavy grease, and in such manner that the act of lubrication of the leaves is automatically performed by their motion in responding to the load pressure and road shocks.

With these and other objects in view, the invention consists of the novel construction of the spring-housing and cap; in the novel construction of the spring-leaves; and in the novel arrangement and relative location of the parts.

The invention further consists of the novel construction for effecting the lubrication of the spring-leaves.

The invention consists of certain other novel details of construction and of combinations of parts, all of which will be first fully described and afterward specifically pointed out in the appended claim.

Referring to the accompanying drawings:

Figure 1 is an elevation of a spring, spring-housing, axle-housing and axle in accordance with this invention.

Fig. 2 is a vertical transverse sectional view through the spring-housing and spring-leaves, illustrating the construction for lubricating the leaves.

Fig. 3 is a top plan view of the spring-housing.

Fig. 4 is an edge elevation of the spring-housing cap.

Fig. 5 is a top plan view of the same.

Fig. 6 is a diagrammatic view of the bottom portion of the spring-housing and axle-housing.

Fig. 7 is a fragmentary plan view of the central portion of one of the spring-leaves.

Like characters of reference indicate the same parts throughout the several figures, in which:

1 indicates an automobile spring made up of a series of spring-leaves 2, the two top leaves of which encircle the spring-eyebolts 3 and transmit the thrust from the spring-housing to the chassis. The central portion of each spring-leaf is enlarged transversely at 4, Fig. 7, so as to provide two rear shoulders 5 and two forward shoulders 6, the position of said shoulders being so that their effective surfaces when the thrust received is to the rear as in propelling the vehicle forward, and to the front when the vehicle is propelled rearward, of a line vertically through the center of the axle.

7 indicates the axle-housing, which in the embodiment shown in the accompanying drawings has cast integral therewith the spring-housing 8. Said spring-housing includes a bearing surface 9 for the spring 1, said surface being projected forwardly and rearwardly in downwardly curved directions reverse to and away from the curvature of the spring, as illustrated at 10 and 11, Figs. 1 and 6. When the spring-housing it attached to and not an integral part of the axle-housing, the spring-housing may be welded on or affixed by cap screws or otherwise.

The leaves 2 of the spring 1 are well curved, as, for instance, as shown in Fig. 1, and in the most efficient embodiment of this invention should be of such curvature and resistance as to normally resist flexing to a horizontal position. This is true whether the spring be an ellipse either above or below the horizontal, as in either instance, if well curved, it can afford resiliency in both the vertical plane and also by yielding when the wheels encounter obstructions, absorb the shock and take it off the axle in a horizontal plane also. The extent of contact of the bottom spring leaf 2 with the housing 8 should not exceed the points F, F', Fig. 6, which points should preferably be within vertical lines tangential to the axle 12 at its front and rear.

Referring now to Figs. 2 and 3, it will be seen that the spring-housing 8 includes walls 14, centrally bulged at 15, as shown in dotted lines in Fig. 3, said formation being in conformity to the central formation of the spring-leaves 2, as shown in Fig. 7. This formation of the walls 14 provides shoulders 16 and 17 complemental to the shoulders 5 and 6 of the spring-leaves 2. The spring-leaves 2 are received between the two walls 14 in the manner as shown in Fig. 2, the construction just described, locking the leaves against fore and aft movement relative to the spring-housing or with relation to each other, to such extent that the thrust imparted by the housing to the spring-leaves is not so imparted by U-bolts as is usual, but from the rear shoulders 17 of the housing to the rear shoulders 5 of the spring-leaves when the thrust is in a forward direction, and from the front shoulders 16 of the housing to the front shoulders 6 of the spring-leaves when the thrust is in a backward direction, as in backing the vehicle.

18 indicates the spring-housing-cap, the bottom surface 19 of which is shouldered at 20 complementally to the plan formation of the spring-housing walls 14, so that said cap 18 fits snugly thereon in the manner as shown in Fig. 2.

As will be seen from Figs. 1 and 4, the elevation formation of the bottom surface 19 of the cap 18 is on a curve, the radius of which is less than that of the spring 1, so that the surface of contact between the cap 18 and the top spring-leaf 2 should not exceed in length the length of contact between the bottom spring-leaf 2 and the central surface of the spring-housing. From this construction it will be seen that the spring 1 is clamped to its housing at its central portion only and for a relatively small distance, thus insuring maximum spring action and resiliency. As the cap can only transmit any force except over a distance equal to the width of the axle diameter, the force so transmitted passes centrally through the axle and affords no lever arm to produce any torque on the housing.

Referring again to Fig. 2, and also to Fig. 3, it will be seen that the cap 18 is secured to the housing by four cap screws 21 and two U-bolts 22, it being understood that said fastenings only serve to hold the cap 18 in proper position and do not serve to transmit thrust from the axle-housing to the spring, as is usual, said thrust being transmitted directly from the spring-housing to the spring-leaves through the medium of the complemental shoulders hereinbefore described.

Referring now to the lubricating system, reference is made to Figs. 2 and 7, wherein it will be seen that each of the spring-leaves 2, except the lowermost one, is centrally apertured at 23, the holes registering one above the other to form in effect a vertical duct or passage, while I provide in the top surface of each spring-leaf 2 and centrally thereof a gradually tapering groove 24, each groove extending about half the length of the spring, as shown in dotted lines in Fig. 1. In the topmost leaf 2 I prefer to affix a bushing 25 for threaded connection with the shank 26 of a grease cup 27, preferably of the self-feeding type. In operation, a suitable lubricating grease is forced from the grease cup 27 downwardly through the hole 23 in each leaf 2 and forwardly and rearwardly of each spring-leaf 2 through the grooves 24.

Having thus fully described the invention, the spring action may be briefly described as follows:

The force of inertia, or that opposing the starting of the load in a forward direction, is to the rear. Where it is resisted it resolves itself into two components, Fig. 6. In this instance one acts to the rear, horizontally and along the rear half of the spring, and the other is at an angle of 90 degrees to this component and downward. The first of these components is resisted by the rear spring-shackle when its limit of play is reached, and the other meets the bottom of the spring-housing between the points F and F', and is also resisted. The resultant line of force, therefore, proceeds midway between these components and in a rearward and downward direction.

The direction of axle thrust on the axle-housing being indicated by the line G—G', Fig. 6, the foremost point of said thrust is the point G, while the point of application of the thrust on the spring by the axle-housing is at the rear complemental shoulders 5 and 17, which, it will be observed, is to the rear of the point G, the point of initial application of the force to the axle-housing. Thus the point F' is where the spring receives the forward thrust or starting torque. Consequently the axle-housing tends to tip downward, but to the rear, and upward in the front, as the axle-housing is free to revolve around the axle, by which it is sustained until resisted. However, as it is impossible for the upward force forwardly to overcome the load of the vehicle, and thus being unable to move upward, and as it cannot tip forwardly, it must of necessity remain stationary.

As distinguishing this action from that following from the usual construction of spring suspension, it is only necessary to consider that in the latter, wherein the spring is bound to a flat axle pad by a U-bolt, which is itself forward of the movement of the driving force represented at G, Fig. 6, the point where the U-bolt binds the spring to the pad is the point at which the initial thrust is imparted to the spring by the axle-housing. This, then, is the point where the inertia of the load is received on the axle pad, with the result that the spring cannot yield over the center of the axle. Being fixed to the truck at its forward end, the chassis must move forward as the spring straightens to respond to the starting impulse and must descend with the chassis. The housing being free to turn on the axle until some resisting force opposes, the result is a forward and downward tipping of the axle-housing. With my construction no longitudinal slotting of the spring-leaves is necessary, thus simplifying their construction and increasing their effectiveness, while only one spring band is required.

Having thus fully described the invention, it is apparent that the embodiment shown in the accompanying drawings is susceptible to changes, alterations and modifications in the design, construction and arrangement of the parts, and I consider myself clearly entitled to all such changes and modifications as fall within the limit and scope of the appended claim.

What I claim as new and desire to secure by Letters Patent of the United States is:

A vehicle spring suspension including, in combination, with an axle housing, a spring, a spring housing positioned on the axle housing and including a spring bearing-surface and including side walls integral with said spring bearing-surface, between which walls, the leaves of the spring are disposed, said side walls being provided with shoulders, the said spring including shoulders complemental to the shoulders in the side walls, a cap for retaining the spring in position and means for retaining the cap in close contact on the spring.

In testimony whereof, I affix my signature, in presence of witnesses.

WILLIAM BELL LOWE.

Witnesses:
WILLIAM W. RILEY,
JOHN J. O'CONNOR,
FRANK K. EMMETT.